(No Model.)
J. DREISÖERNER.
STEAM PRESSURE REGULATOR.
No. 540,154. Patented May 28, 1895.
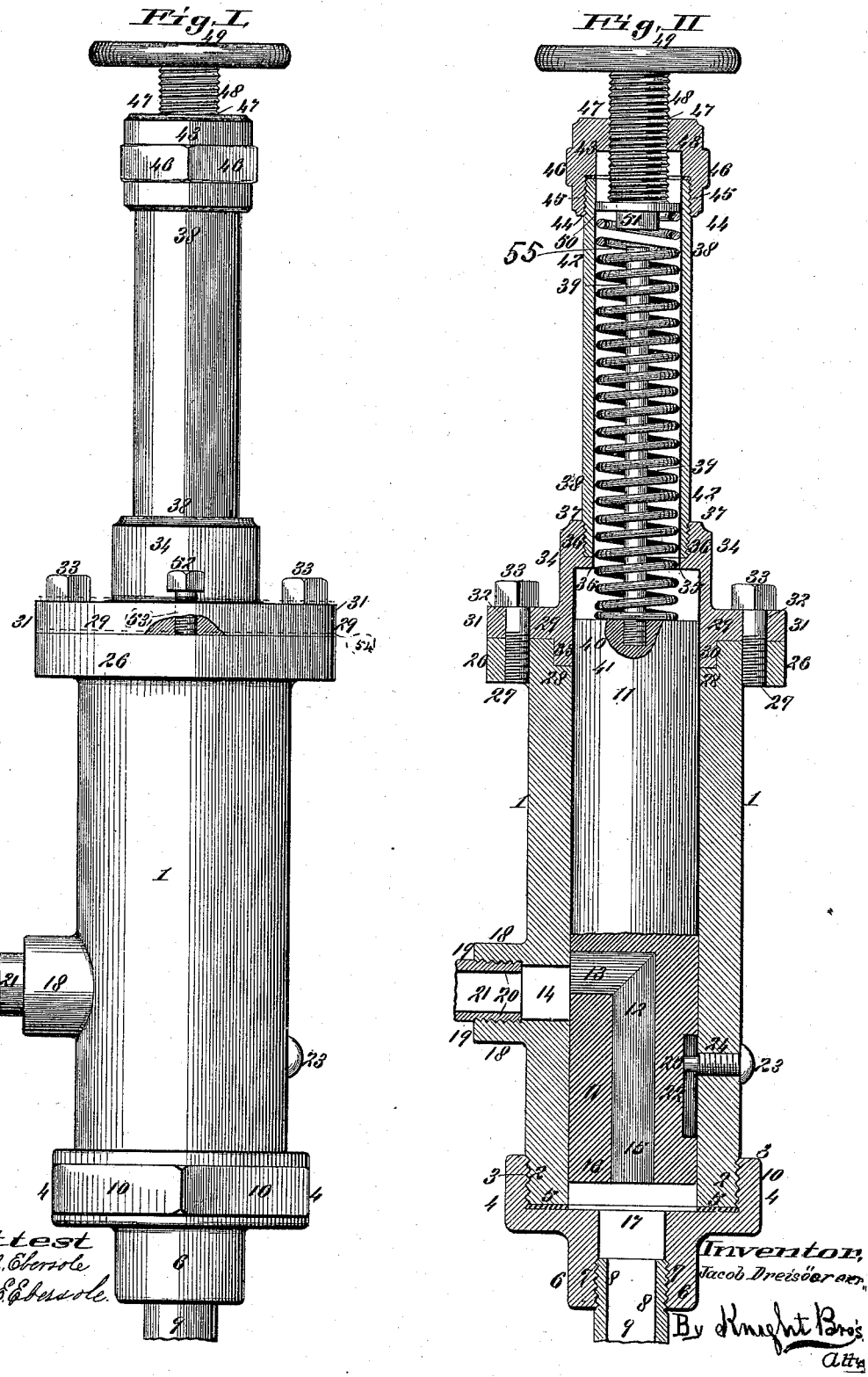

UNITED STATES PATENT OFFICE.

JACOB DREISÖERNER, OF ST. LOUIS, MISSOURI.

STEAM-PRESSURE REGULATOR.

SPECIFICATION forming part of Letters Patent No. 540,154, dated May 28, 1895.

Application filed July 10, 1893. Serial No. 480,021. (No model.)

*To all whom it may concern:*

Be it known that I, JACOB DREISÖERNER, of the city of St. Louis, in the State of Missouri, have invented a certain new and useful Improvement in Steam-Pressure Regulators, of which the following is a full, clear, and exact description, reference being had to the accompanying drawings, forming part of this specification.

This invention relates to a pressure regulator comprising a piston, and a cylinder in which the piston works and through which the steam is furnished, the steam being received from a radial port in the cylinder into and through an elbow passage in the piston and discharges the same into the pipe that conducts the steam to its destination, it may be for cooking, heating, or for mechanical purposes; the pressure and consequent heat being regulated by the adjusted pressure of a coil spring, governed by a set-screw; and the invention consists in features of novelty hereinafter fully described and claimed.

Figure I is a side elevation of my improved steam-pressure regulator. Fig. II is a vertical section thereof.

Referring to the drawings, 1 represents the cylinder, the peripheral screw 2 around the foot of which engages and is seated within the internal screw 3, in the lower head 4, being screwed home until the elastic gasket 5 is tightly pressed between the end of the cylinder, and the lower head so as to effect a steam tight joint. The tube 6 of the lower head 4 has an internal screw 7, in which is seated the peripheral screw 8 of a pipe 9 that conducts the steam to its destination, either for cooking or for heating purposes, or for mechanical appliances.

10 is a wrench seat around the periphery of said lower head 4.

11 represents the piston that is adjusted and slides in the cylinder 1, and 12 is an elbow passage, the upper radial induction end 13 of which extends through the periphery of the piston, and takes steam when brought into coincidence therewith from the radial supply port 14. The longitudinal end 15 of the passage discharges through the base 16 of the piston into the chamber 17, ready for use.

18 represents a radial tube that projects from the side of the cylinder 1, from the supply port, and within the internal screw 19 in which the peripheral screw 20 of the steam supply pipe 21 is seated; the said supply pipe taking steam from any suitable source.

22 represents a longitudinal slot in the side of the piston 11, and 23 is a radial screw that engages in its radial screw seat 24 in the cylinder, and the reduced end 25 of the screw, projects within the slot and keeps the piston from radial digression.

26 represents an annular flange that surmounts the cylinder 1 having screw seats 27.

28 is an inner annular recess in the top of the cylinder.

29 represents the upper head of the cylinder, the pendent annular flange 30 from which is seated in the annular recess 28 in the cylinder. The collar 31 of the upper head is provided with perforations 32, through which the screws 33 pass that are screwed home in the coincident screw seats 27 of the flange of the cylinder below, so as to firmly secure the upper head to the cylinder.

34 represents the hollow pedestal of the upper head, and 35 is an internally projecting annular ledge and above the ledge is an internal screw 36, in which the peripheral screw 37 at the base of the spring inclosure column 38 is screw seated.

39 represents a push-rod, the lower screw 40 of which engages in the screw socket 41 in the top of the piston 11.

42 represents a spiral spring that is mounted on the piston around the push-rod 39.

55 represents the push-head or top of the rod 39, which as shown in Fig. II does not reach to the top of the non-compressed spring 42, and against which push-head and its rod 39 the set screw 48 engages when a heavy inelastic pressure is required.

43 represents the cap of the column, the inner screw 44 of which engages on the peripheral screw 45, on the summit of the column 38.

46 is a wrench seat around the cap, for mounting the wrench that seats and tightens the screw.

47 represents a screw seat in the center of the cap in which the set screw 48 works when operated by its surmounting hand-wheel 49.

50 represents a disk at the foot of the set-screw, that moves therewith, and as the disk is of about the same diameter as the inside of the column 38, and rests on the coil spring 42, the said spring is governed by the respective advancing or receding set screw.

51 is a pendent guide block secured beneath the disk that works within the coil spring, and which abuts against the summit of the push-rod to stop the further advance of the screw and consequent depression of the spring or push-rod and piston when the induction end 13 of the elbow passage 12 is in full, open registry with the supply port 14, so that no further extension of the steam supply and consequent additional pressure can be obtained by any further depression of the piston.

52 are two set screws for supporting the upper head on the annular flange and which are adjusted in their screw seats 53 in the upper head 29, of the cylinder and are screwed down against the surmounting flange 26 of the cylinder to leave a space between the flange and the upper-head when it is found advisable to admit a slight current of air into the top of the cylinder thus providing an air passage 54 as indicated in dotted lines.

The set screw has control of the action of the piston, in conjunction with the steam pressure upward on said piston from the chamber 17. Thus when the set screw 48, and the spring 42 it controls are set in the position shown in Fig. II, the piston 11 will normally, during the major culminate of its impulsive spring pressure throb be as shown in said Fig. II at about thirty-five pounds, pressure with a corresponding heat. If it is desired to reduce said pressure, or the consequent heat that it engenders, the said result is immediately attained by turning the set-screw 48 upward, that is unscrewing the same, until the head of the steam is reduced to the amount required, or if need be, until the supply port 14 is entirely closed. When, however, it is desired to increase the head of steam, the set-screw is screwed down which may, in extreme cases, be effected until the pendent guide and stopper block 51 come into abutting contact with the push head top 55 of the rod 39, on which occasion the set screw and its controlling disk may be turned down on the push-head of said rod until there will be a full coincidence of the elbow-passage with its supply port, and in consequence a full head of steam. Now it will be seen that there is also a constant, but variable reactionary pressure on the piston from the head of steam in the pressure chamber 17, which operates to effect a vibratory back action movement to the piston. Thus supposing the set-screw is set as shown in Fig. II, with about thirty-five pound head, the steam which has exerted the same thirty-five pound back pressure on the piston in opposition to the spiral spring and screw, works forward and through the conductor supply pipe 9, and is utilized for either its heating, cooking or mechanical purposes, as the case may be. Now the active steam meets with a variable exhaust at its work, and in the meantime the screw spring pressure on the piston is impulsively maintained, or should a higher inelastic pressure be required as stated, by the downward action of the set screw or the push-rod, the said high inelastic pressure is obtained.

By the above means when the spring pressure is in use there is a variable impulsive action maintained on the piston, which alternately, in response to the set screw and spiral spring on the one hand, and the head of steam on the other, pulsates back and forth, and thus also by the said pulsation it constantly periodically varies the head of steam in the chamber 17, and a live reactionary elastic piston movement is constantly maintained. It will thus be seen that the pressure is regulated by and under the complete control of the set screw, the impulsive vibrating spring in light pressure and the inelastic push-rod in heavy pressure in combination with the reactionary impact of steam in the chamber 17 on the piston 11.

Having thus described my invention, the following is what I claim as new therein and desire to secure by Letters Patent:

1. A steam pressure regulator comprising a cylinder 1, formed with a radial port 14 at one side thereof, with a radial tube 18 in line with the port, and with an annular flange 26 at the top of the cylinder, the lower head 4 formed with a chamber 17 and with a tube 6, the upper head 29 formed with a collar 31 and with a pedestal 34 having an internal ledge 35, the column 38, supported on the ledge, the cap 43, the piston 11 formed with an elbow-passage 12 for connecting the radial port with the chamber, a push-rod 39 secured to the piston, a coil spring 42, surrounding the push-rod and supported on the piston, and the set screw 48 carrying a disk 50 which seats on the spring and is adapted to seat on the push-rod for holding down the piston; substantially as described.

2. A steam pressure regulator comprising a cylinder 1, formed with a radial port 14, at one side thereof, with a radial tube 18 in line with the port, with an inner annular recess 28 and an annular flange 26 at the top of the cylinder, the lower head 4 formed with a chamber 17 and with a tube 6, the upper head 29 formed with a pendent annular flange 30 fitting the annular recess, with a collar 31 and with a pedestal 34 having an internal ledge 35, the column 38, supported on the ledge, the cap 43, the piston 11 formed with an elbow-passage 12 for connecting the radial port with the chamber, a push-rod 39 secured to the piston, a coil spring 42, surrounding the push-rod and supported on the piston, and the set-screw 48 carrying a disk 50 which seats on the spring and is adapted to seat on the push-rod for holding down the piston; substantially as described.

JACOB DREISÖERNER.

In presence of—
  BENJN. A. KNIGHT,
  A. M. EBERSOLE.